US006816281B1

(12) United States Patent
Ayling et al.

(10) Patent No.: US 6,816,281 B1
(45) **Date of Patent: *Nov. 9, 2004**

(54) STORAGE OF LABELS IN A PRINTING DEVICE

(75) Inventors: Clive Lawrence Ayling, Hauxton (GB); Michel Woodman, Huntingdon (GB); David Roger Tegerdine, Royston (GB); Geoffrey Stuart Howe, Newton (GB)

(73) Assignee: Esselte, Sint-Niklaas (BE)

( * ) Notice: Subject to any disclaimer, the term of this patent is extended or adjusted under 35 U.S.C. 154(b) by 855 days.

This patent is subject to a terminal disclaimer.

(21) Appl. No.: 09/628,808

(22) Filed: Jul. 28, 2000

(30) Foreign Application Priority Data

Jul. 30, 1999 (GB) .............................................. 9918042

(51) Int. Cl.[7] .......................... B41J 2/325; G06F 15/00; G06K 1/00

(52) U.S. Cl. ..................... 358/1.16; 358/1.18; 358/404; 358/444; 400/61; 400/56; 400/120.01; 400/545; 400/556

(58) Field of Search .............................. 400/120.01, 61, 400/56, 545, 556; 358/1.14, 1.18, 404, 444

(56) References Cited

U.S. PATENT DOCUMENTS

| | | | | | |
|---|---|---|---|---|---|
| 5,020,928 | A | * | 6/1991 | Akiyama et al. | 400/193 |
| 5,441,586 | A | * | 8/1995 | Fukunaga et al. | 156/387 |
| 5,575,573 | A | | 11/1996 | Ito et al. | 400/76 |
| 5,595,447 | A | * | 1/1997 | Takayama et al. | 400/615.2 |
| 5,833,379 | A | * | 11/1998 | Kano | 400/615.2 |
| 5,947,619 | A | | 9/1999 | Kurashina et al. | 400/615.2 |
| 5,951,174 | A | * | 9/1999 | Handa | 400/120.01 |
| 6,007,262 | A | | 12/1999 | Kurashina | 400/615.2 |
| 6,129,466 | A | * | 10/2000 | Suzuki | 400/615.2 |
| 6,351,275 | B1 | * | 2/2002 | Ayling et al. | 347/171 |
| 6,538,765 | B1 | * | 3/2003 | Ikedo | 358/1.16 |

FOREIGN PATENT DOCUMENTS

| | | | |
|---|---|---|---|
| EP | 0 513 290 | 11/1992 | B41J/2/485 |
| EP | 0 600 593 | 6/1994 | G06K/15/00 |
| EP | 0 634 274 | 1/1995 | B41J/3/407 |
| EP | 0 768 611 | 4/1997 | G06F/17/21 |
| EP | 1 072 423 | 1/2001 | B41J/3/407 |

OTHER PUBLICATIONS

Patent Abstracts of Japan, vol. 1997, No. 01, Jan. 31, 1997 & JP 08 230252 A (Casio Comput Co Ltd), Sep. 10, 1996.
Patent Abstracts of Japan, vol. 1995, No. 08, Sep. 29, 1995 & JP 07 114541 A (Toshiba Corp), May 2, 1995.

* cited by examiner

*Primary Examiner*—Edward Coles
*Assistant Examiner*—David L Jones
(74) *Attorney, Agent, or Firm*—Morgan, Lewis & Bockius LLP

(57) ABSTRACT

A printing device is described, predominantly for printing labels on a tape. The printing device has a display and input means for inputting characters to be printed by the printing device. Using the input means, a cursor on the display can be controlled. The printing device has a label memory which comprises a storage portion having a plurality of storage sections. The display is operable to display a plurality of label access elements each of which represents a respective storage section in the storage portion of the memory. The cursor is used to access a selected storage section of the memory associated with the label access element identified by the cursor position. A method of storage label data in a label memory using this principle is also described.

12 Claims, 4 Drawing Sheets

FIG.4
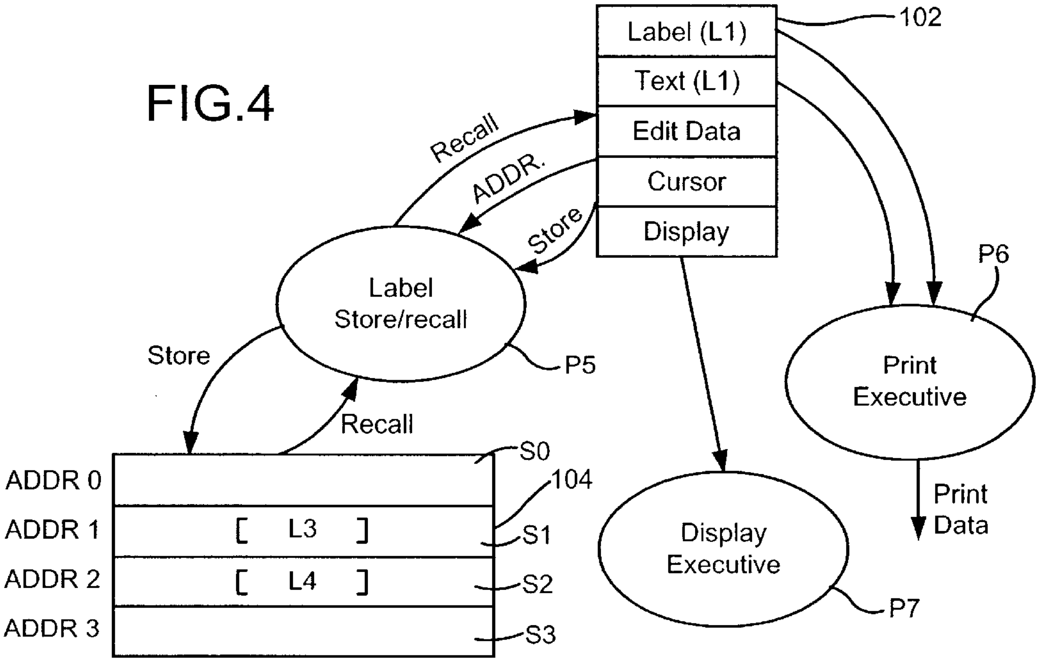
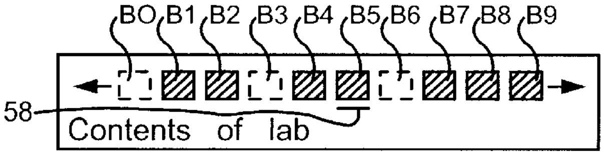
FIG.5
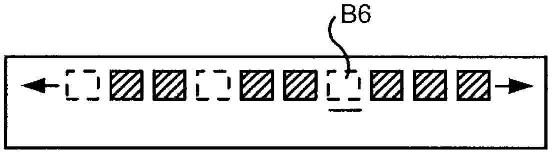
FIG.6
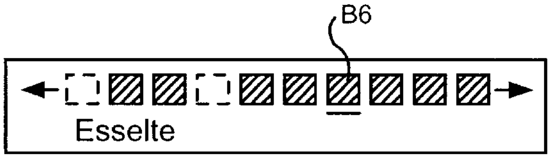
FIG.7

STORAGE OF LABELS IN A PRINTING DEVICE

FIELD OF THE INVENTION

The present invention relates to storage of labels in a printing device and is particularly concerned with a printing device where the label size is not predetermined by a particular label stock.

BACKGROUND TO THE INVENTION

There are now known thermal printing devices which produce labels having a length corresponding to a message to be printed as defined by a user. Such devices operate with a supply of tape arranged to receive an image and a means for transferring an image onto the tape. In one known device, a tape holding case holds a supply of image receiving tape and a supply of an image transfer ribbon, the image receiving tape and the transfer ribbon being passed in overlap through a print zone of the printing device. At the print zone, a thermal print head cooperates with a platen to transfer an image from the transfer ribbon to the tape. A printing device operating with a tape holding case of this type is described for example in EP-A0267890 (Varitronics Inc). In this printing device, the image receiving tape comprises an upper layer for receiving an image which is secured to a releasable backing layer by a layer of adhesive.

In another device, the construction of the image receiving tape is such that the upper image receiving layer is transparent and receives an image on one of its faces printed as a mirror image so that it is viewed the correct way round through the other face of the tape. In this case, a double-sided adhesive layer can be secured to the upper layer, this double-sided adhesive layer having a releasable backing layer.

This latter arrangement is described for example in EP-A-0322918 and EP-A0322919 (Brother Kogyo Kabushiki Kaisha), and in EP-A-0487312 (Esselte N.V.).

Printing devices of this type also include a display means and an input means such as a keyboard for selecting characters to be printed. Selected characters are displayed on the display means and in this way a user can compose a label to be printed. When a label has been composed a print instruction is given and the printing device proceeds to print a label. Printing devices of this type also include cutting means to cut off the printed portion of the tape to enable it to be used as a label. For use as a label, the releasable backing layer is removed from the upper layer to enable the upper layer to be secured to a surface by means of the adhesive layer. In this way, labels having a length and character arrangement determined by a user can be made.

It is useful in label printing devices of this type to be able to store labels which have been formulated by a user for subsequent use. EP 0607024 (Esselte N.V.) describes a label printing device in which labels are stored under corresponding key words or tags. Thus, a user can attempt to find a label by entering a key work or tag and scrolling through possible labels.

It is an aim of the present invention to provide a more user-friendly and simple to use label access arrangement.

SUMMARY OF THE INVENTION

According to one aspect of the present invention there is provided a printing device comprising: a display, user input means for inputting characters to be printed by the printing device and including cursor control means for controlling the position of a cursor on the display and function control means for controlling functions of the display: a controller responsive to the cursor control means and the function control means to control the printing device; and a label memory comprising a storage portion having a plurality of storage sections; wherein the controller is operable in a label access mode to display a plurality of label access elements, each label access element representing a respective storage section in the storage portion of the memory, and responsive to said cursor control means to access a selected storage section of the storage portion associated with the label access element identified by the position of the cursor.

Another aspect of the invention provides a method of storing label data in a label memory, the label memory comprising a storage portion having a plurality of storage sections, the method comprising the steps of; displaying a plurality of label access elements on a display of the printing device, each label access element representing a respective storage section in the storage portion of the label memory; detecting the position of a cursor movable on the display; and accessing a selected one of said storage sections associated with the label access element identified by the cursor position.

In the described embodiment, the label access elements comprise boxes which, when black, denote a full storage section (that is one containing label data), and, when clear, denote an empty storage section.

A user can store label data into a selected storage section by entering a store mode of operation, placing the cursor below the desired label access element and pressing a return key. This has the effect of storing label data held in a working portion of the memory into the selected storage section denoted by the label access element selected by the cursor.

Label data can be recalled from a storage section into the working portion of the label memory for subsequently editing and/or printing by entering a recall mode of the device, placing the cursor under the selected label access element and pressing the return key. This causes the data held in the storage section denoted by the selected label access element to be transferred into the working portion for editing and/or printing. A copy is retained in the storage section unless a clear operation is implemented by the user to delete the label data from the storage section.

It will be appreciated that one way of implementing the above-referenced aspects of the invention is to associate the position of the cursor, which is held in the working portion of the label memory in an edit part thereof, with an address used for accessing the storage portion of the label memory, such that each position of the cursor identifies a particular address for accessing one of the storage sections.

In the described embodiment, the display is provided into first (upper) and second (lower) display portions. The sequence of label access elements are displayed in the upper portion, while the first line of a label stored in the storage section denoted by the position of the cursor is displayed in a lower portion of the display.

The printing device can comprise a single casing which houses, together with the features of the invention, a printing mechanism for printing the print data derived from the label data on a column-by-column basis. The printing mechanism can comprise a thermal dot print head for example. Feeding means can be provided for feeding tape past the printing mechanism, such tape being housed in a cassette located in a cassette bay of the printing device.

For a better understanding of the present invention and to show how the same may be carried into effect, reference will now be made by way of example to the accompanying drawings.

BRIEF DESCRIPTION OF THE DRAWINGS

FIG. 4 is a diagram illustrating the storage function of the device; and

FIGS. 5 to 7 illustrate the display at various stages in operation of the device to implement a store or recall function.

DESCRIPTION OF THE PREFERRED EMBODIMENTS OF THE INVENTION

Figure 1:
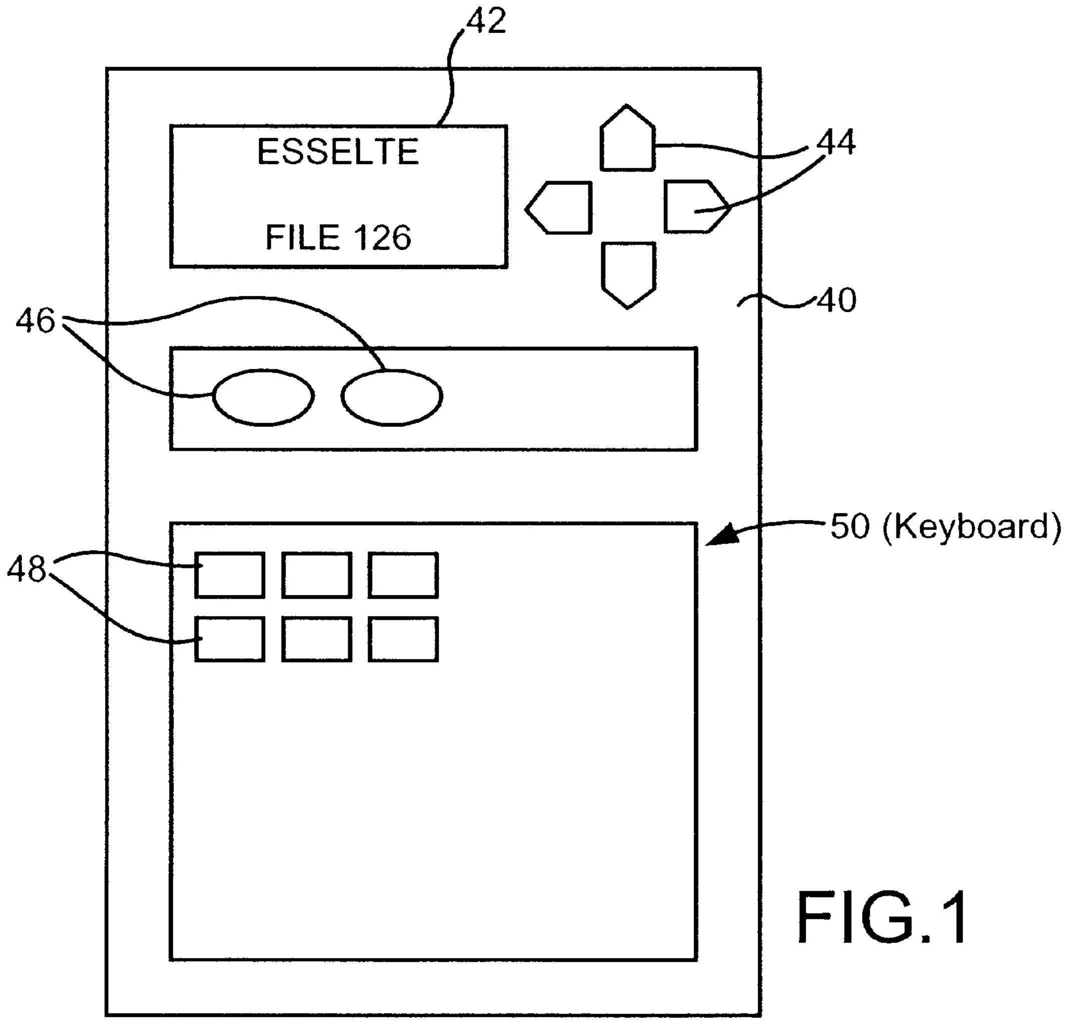
FIG. 1 is a schematic diagram of the front part of the casing of a printing device.

FIG. 1 illustrates the front of a tape printing device. Reference numeral 40 denotes the casework of the printer. The front of the printer carries a liquid crystal display (LCD) 42 and a keyboard 50 having a plurality of cursor control keys 44, a plurality of function keys 46, only two of which are illustrated in FIG. 1, and a plurality of character selecting keys 48, only six of which are illustrated in FIG. 1. The function keys include a return key, a save key, a recall key, a clear key, an edit key and a preview key. As is known, combinations of keys can be used in place of individual keys for each function. The display can display two lines of text. The display is illustrated displaying the two line label (L1) ESSELTE (first line) FILE 126 (second line). As is known, the character selecting keys 48 allow characters to be selected by a user to formulate labels to be printed. The function keys 46 allow different functions to be implemented, and in effect control the operational modes of the printer.

The printer operates with a supply of tape on which images are printed. Lengths of the tape are cut off after a label has been printed. The tape is housed in a cassette which is held in a cassette bay on the underside of the printer.

Figure 2:
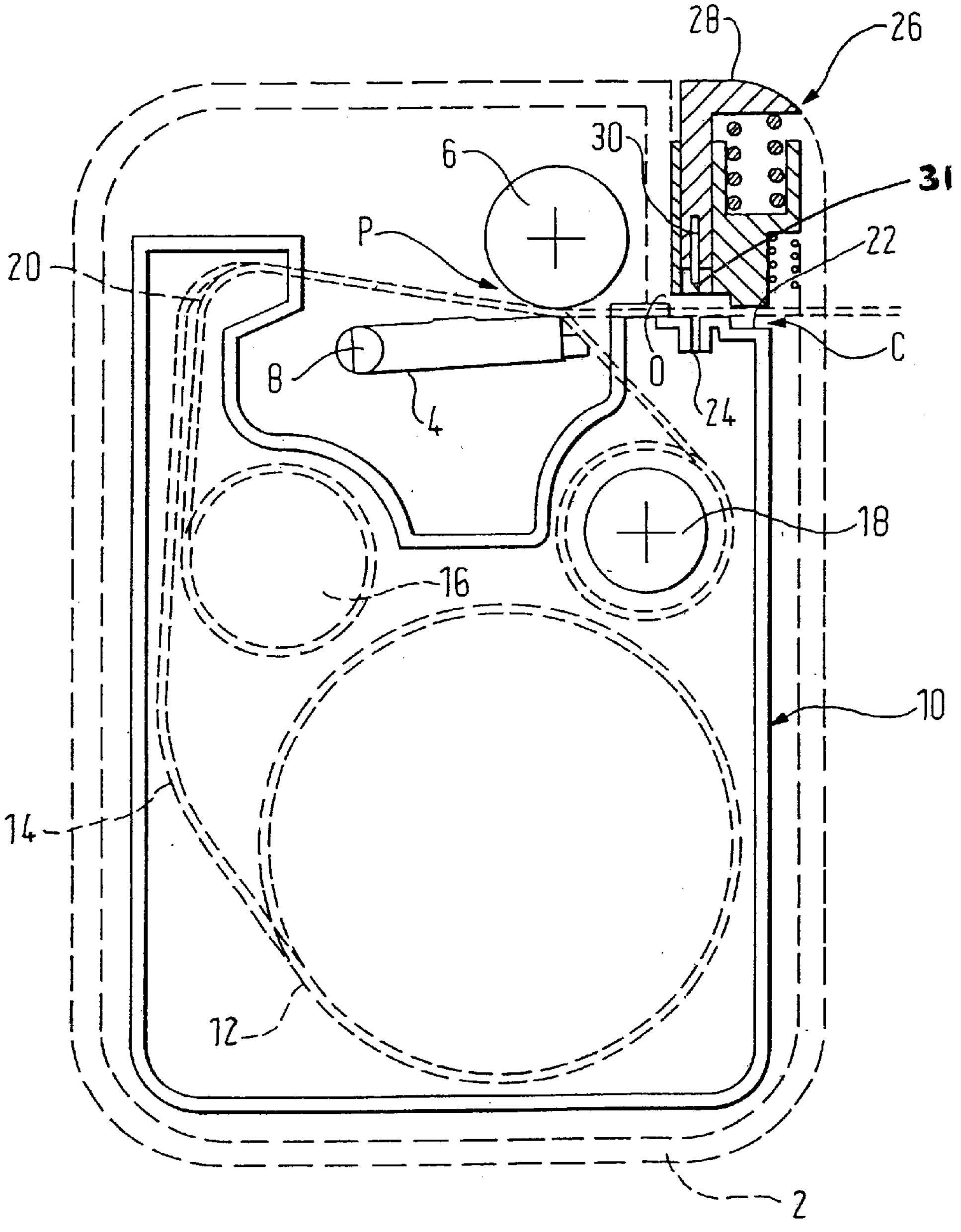
FIG. 2 is a diagram showing the underside of the printing device including the cassette bay and a cassette housed therein.

FIG. 2 illustrates in plan view a cassette bay of a printing device. The cassette bay is shown by the dotted line 2. The cassette bay includes a thermal print head 4 and a platen 6 which cooperate to define a print location P in a manner which is known in the art. The print head 4 is pivotable about a pivot point 8 so that it can be brought into contact with the platen 6 for printing and moved away from the platen to enable a cassette to be removed and replaced.

A cassette inserted into the cassette bay 2 is denoted generally by reference numeral 10. The cassette holds a supply spool 12 of image receiving tape 14 which comprises an image receiving layer secured to a backing layer by a layer of adhesive. The image receiving tape 14 is guided by a guide mechanism (which is not shown) through the cassette, out of the cassette through an outlet 0, past the print location P to a cutting location C. The cassette 10 also has an ink ribbon supply spool 16 and an ink ribbon take up spool 18. The ink ribbon 20 is guided from the ink ribbon supply spool 16 through the print location P and taken up on the ink ribbon take up spool 18. The image receiving tape 14 passes in overlap with the ink ribbon 20 through the print location P with its image receiving layer in contact with the ink ribbon.

In the printing device illustrated in FIG. 1, the platen 6 is driven so that it rotates to drive the image receiving tape 14 past the print location P during printing. In this way, tape is printed and fed out from the print location P to the cutting location C. The portion of the wall of the cassette 10 wherein the cutting location C is defined is denoted by reference numeral 22. A slot 24 is defined in this wall portion and the image receiving tape 14 is fed past the print location P to the cutting location C.

The printing device includes a cutting mechanism denoted generally by reference numeral 26. This cutting mechanism includes a cutter support member 28 which carries a blade 30. The blade 30 cuts the image receiving tape 14 and then enters the slot 24 with the leading part of its edge 31 first, rather than bearing against an anvil.

Figure 3:
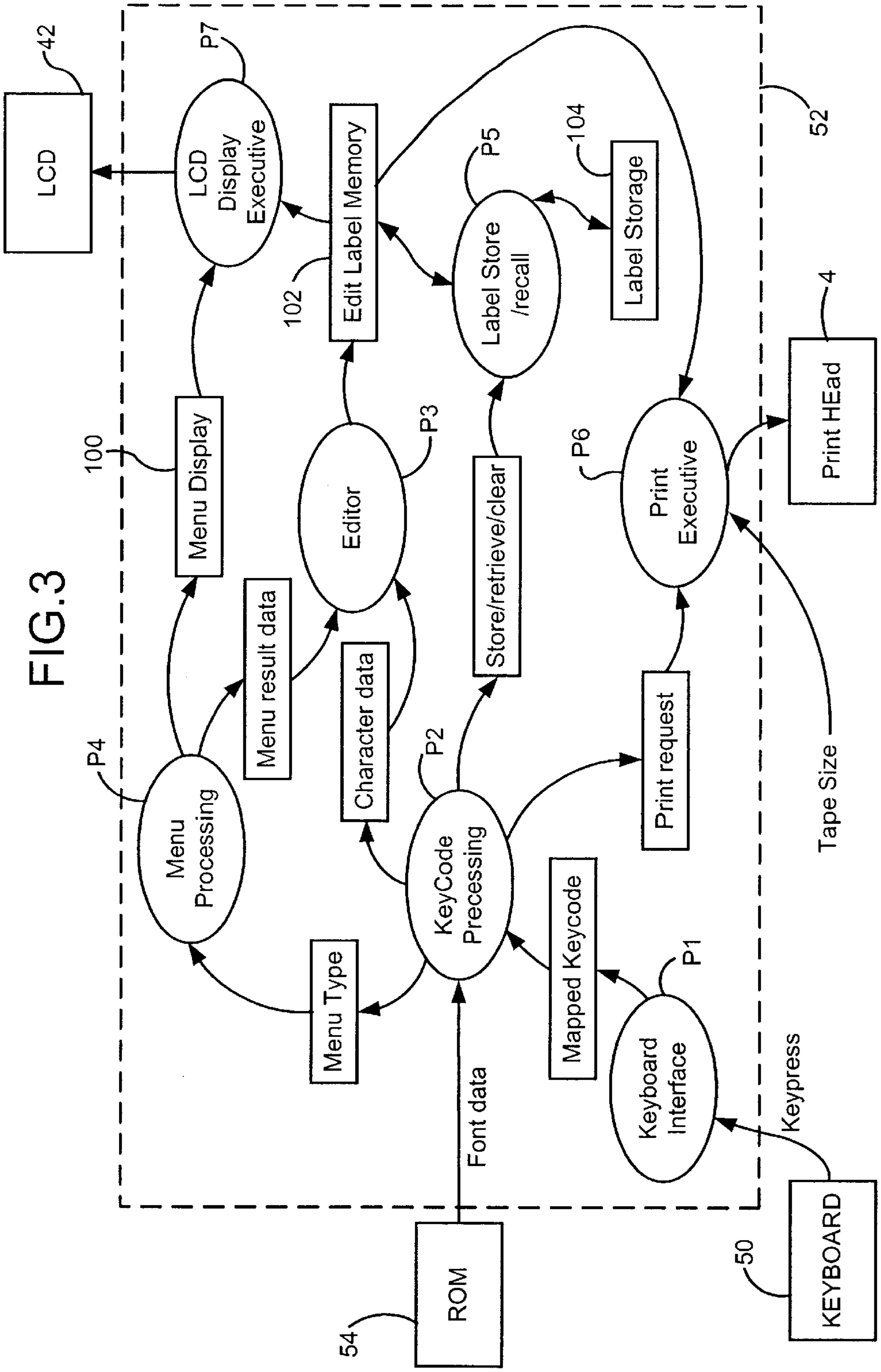
FIG. 3 is a diagram illustrating the control components of the printing device.

FIG. 3 illustrates the control components of the printer. The sketched line 52 represents a print controller which can be for example a microprocessor. The circles within the controller 52 denote program components which are run on the processor to implement different control functions as described in the following. The controller 52 includes or is connected to random access memory (RAM). This RAM is illustrated as distributed in FIG. 3 and it will be understood that it may be implemented on the same chip as the processor, or be provided as a separate chip. The blocks with double lines at the top and bottom labelled 100,102,104 represent portions of RAM. In addition, the controller 52 contains or is associated with a read only memory (ROM) 54 which holds font data for the characters. The controller 52 controls operations of the display 42 and supplies print data to the print head 4. It receives inputs from the ROM 54 and the keyboard 50.

The controller 52 runs a number of different programs to control operations of the printer. A keyboard interface program P1 receives key presses from the keyboard 50 and provides mapped key code data to a key code processing program P2. The key code processing program P2 has a number of different functions. It supplies menu-type data to a menu processing program P4 depending on the menu which is selected by the function keys 46 of the printer. The key code processing program P2 supplies character data to an editor program P3 depending on the characters selected by the character selection keys 48 of the keyboard 50. The key code processing program P2 supplies label store/recall functions to a label store/recall program P5. Finally, the key code processing program P2 supplies print request data to a print executive program P6.

The menu processing program P4 supplies menu result data to the editor program P3 and also supplies menu display data for storage in the RAM portion 100. The editor program P3 acts on the menu result data and character data to formulate and edit a label which is stored in a working portion of the RAM, labelled 102 in FIG. 3. The working portion of the RAM holds data defining the current label which is being formulated and/or edited.

The label store/recall program P5 is operable responsive to store/recall functions supplied from the key code processing program P2 to transfer label data between the working portion 102 of the RAM and a storage portion 104 of the RAM.

The print executive program P6 receives tape size information (discussed later) in conjunction with print requests from the keyboard and controls operation of the print head 4 based on the label data which is held in the working portion 102 of the RAM.

Finally, the controller 52 runs an LCD display executive program P7 which manages data to be displayed on the display 42 based on the contents of the menu display portion 100 of the RAM and the working portion 102 of the RAM.

The printer can accommodate tapes having a plurality of different widths, in particular 6 mm, 9 mm, 12 mm, 19 mm and 24 mm. A switch allows a selection to be made between three settings, 6 mm; 9/12 mm, 19/24 mm. The manner in which this switch cooperates with the printer is described in our earlier European Patent EP634274 and therefore is not discussed further herein. In any event it will be appreciated that any manner of conveying tape size information to the print executive program P6 may be used.

Label data is held in the working portion 102 of the RAM in different data structures as shown in FIG. 4. In particular, a text data structure labeltype (marked text in FIG. 4) holds text data (CharCode) regarding the characters and symbols etc which have been selected for printing. The text data includes new page and new line information. An attribute data structure pagesettingtype (marked label in FIG. 4) holds attributes with which the characters are to be printed, and effectively defines the format of the label. In addition, the working portion 102 of the RAM contains edit data including the position of a cursor as a file cursortype and display control information. At any time, label data and edit data for one label is held in the working portion 102 of the RAM. The data structures labeltype, pagsettingtype, cursortype and displaytype are shown in the form of header files in C in Annexe I.

The print executive program P6 generates print data for the print head as a sequence of columns of dot data based on the text data and attribute data. The edit data is not used for printing. The print executive P6 does not formulate a complete dot pattern image of the label to be printed in RAM prior to printing. Instead, column data is prepared "on the fly". Thus, the print executive program P6 extracts text data from the text data structure and attribute data from the attribute data structure and manipulates this data to generate successive print columns. The print head contains a buffer which holds one column of dot data, while the print head itself prints a column of dot data at a time.

Thus, while the print head is printing one column, the next column can be placed in the buffer ready for printing. This technique is described in our earlier European Patent EP513290.

The label storage portion 104 of the RAM comprises a plurality of label storage sections each of which are individually addressable. This is diagrammatically illustrated in FIG. 4 where each label storage section S0 to S3 is marked as a row addressable under addresses ADDR0,ADDR1, ADDR2 etc. Four sections are illustrated although in fact in the preferred embodiment there are ten such sections. Any number of sections can be provided. Moreover, it will readily be appreciated that the organisation of the storage sections in memory is not critical and any suitable organisation and address semantics may be used. The illustration in Figure 4 is simplified for the purposes of explanation.

Sections can be "full" or "empty". Each full section contains sufficient label data (text and attributes) to define one label. In FIG. 4, sections S0,S3 are empty, sections S1,S2 hold label data defining labels L3,L4 respectively. The label storage sections are used as follows. A user can formulate and edit a label which is held in the working portion 102 of the RAM in an edit mode of the printer. The edit mode is entered by pressing an edit function key 46. In the edit mode, both lines of the two line display 42 display label information allowing a user to enter and formulate character and atribute data to define a label. When the user wishes to store that label into memory, he enters a store mode using a save function key 46. On entering the store mode, the display is as illustrated in FIG. 5, except that in practice the dotted blocks are shown clear on the display. The top line of the display displays a sequence of ten boxes B0 to B9. Each box represents a storage section S0 etc. Block boxes denote a full section and clear boxes denote an empty section. The display also includes a cursor 58 the position of which can be controlled on the display by the cursor control keys 44. This is achieved by the keyboard interface program P1 and the key code processing program P2. When the store mode is entered, the position of the cursor on the display is beneath the box representing the storage section which was last used to store or overwrite a label. In this case, the cursor is under box B5 and let us suppose that that represents storage section S2. The second line of the display shows the first line of the label L4 which is stored in the storage section S2 represented by the box B5, in this case "contents of lab". Actuation of the preview key causes the label contents to scroll along on the display so that the user can see the entire contents of the label.

The user can choose whether to overwrite the contents of a full storage section, or to use an empty storage section by moving the cursor 58 using the cursor position keys 44. In this case we will assume that he wishes to store the label L1 which is just formulated into the storage section S3 represented by the clear box 86. To achieve that, he moves the cursor right until the display is as shown in FIG. 6. In this case of course the second line of the display is clear because the section S3 corresponding to the box B6 is empty. The user then presses a return key which has the effect of transferring the label data from the working portion 102 of the RAM into the storage section S3. The display then looks like FIG. 7. That is, the clear box B6 has now become black to represent a full storage section, and the second line of the display displays the first line of the label L1, that is "ESSELTE". Moreover, the storage section S3 shown empty in FIG. 4 now contains the text data structure and attribute data structure defining label L1 which were previously held in a working portion 102 of the memory.

The above functions are carried out by the label store/recall program P5 responsive to the aforementioned key presses which are processed by the keyboard interface program P1 and the key code processing program P2. Cursor position data is retrieved from the working portion 102 of the RAM and is used by the label store/recall program P5 to address the correct storage section SO etc in the storage portion 104 of the RAM. Thus, it is an important feature of the label store/recall program P5 that it is capable of accepting cursor position data from the cursor file in a working portion 102 of the memory and using that data to generate addresses for accessing the storage portion 104 of the memory to achieve the functions described above.

Other labels can be formulated and stored up to a maximum of the number of special storage sections provided in the printer. As mentioned, there are ten in the preferred embodiment.

In order to recall stored labels, a user enters recall mode using a recall function key 46. The display appears again as in FIG. 5. That is, the boxes B0 to B9 are displayed on the top line of the display (clear or black), with the cursor 58 below the last used box. Once again assume this was B5. In order to select a stored label, the user moves the cursor 58 using the cursor control keys 44 until the cursor is beneath the desired box. Assume that the user wishes to retrieve the label in Box B6. In that case the display is as in FIG. 7. To select the label, the user depresses the return function key 46 to implement a recall function. This is conveyed to the keyboard interface program P1 and, via the key code processing program P2 to the label store/recall program P5. The cursor position is also conveyed to the label store/recall program to address the storage section S3. On depressing the return key the text data and attribute data are copied from the storage section S3 to the working portion 102 of the RAM. The original data is retained in the storage section S3. The printer enters an edit state in which the whole label is displayed as illustrated in FIG. 1, and the user can then edit or simply print the label by issuing edit command or a print command respectively.

Label data can be removed from a storage section in two ways. It is possible to store labels in a box which is already full, in which case the label data in the working portion 102 of the RAM will overwrite the label data which was stored in that section. It is also possible to clear a storage section by placing the cursor under the selected box and operating a clear function key 46.

The display functions are controlled by the display executive program P7 responsive to the mode of the device and the data held in the working portion 102 of the RAM, in particular the position of the cursor.

```
ANNEXE 1
    Label.h
typedef struct {
    unsigned            boxStyle:3;
    unsigned            alignment:2;
    unsigned            mirror:1;
    unsigned            background:5;
    uint16              fixedLength;
    PageSettingType   pageSettings[MAX_PAGES] ;
    CharCode            next[MAX_TEXT_SIZE] ;
    PageStruct        pages[MAX_PAGES]
} LabelType;
    Display.h
typedef CharCode DisplayText[DISPLAY_LINES]
[DISPLAY_WIDTH] ;
    Cursor.h
typedef struct   {
    uint8 x; /* character position from left */
    uint8 y; /* line number counting from top downwards */
    CharCode    *pos; /* pointer into text */
} CursorType;
    Page.h
typedef struct {
    unsigned justify:1;
    unsigned style:3;
    unsigned underline:1;
    unsigned width:2;
    unsigned height:2;
    unsigned vertical:1;
} PageSettingType;
```

What is claimed is:

1. A printing device comprising:

a display;

user input means for inputting characters to be printed by the printing device and including cursor control means for controlling the position of a cursor on the display and function control means for controlling functions of the display;

a controller responsive to the cursor control means and the function control means to control the printing device; and a label memory comprising a storage portion having a plurality of storage sections for holding label data defining a label to be printed;

wherein the controller is operable in a label access mode to display a plurality of label access elements in a first portion of the display, each label access element representing a respective storage section in the storage portion of the memory, and responsive to said cursor control means to access a selected storage section of the storage portion associated with the label access element identified by the position of the cursor, and to display at least a part of any label data of the selected storage section in a second portion of the display.

2. A printing device according to claim 1, wherein the label memory comprises a working portion which holds label data defining a label under edit, wherein the controller is operable in a label store mode to transfer said label data to said selected storage section of the storage portion.

3. A printing device according to claim 2, wherein the controller is operable in a label recall mode to copy label data from said selected storage section to the working portion of the label memory.

4. A printing device according to claim 1, wherein some or all of said storage sections contain label data defining respective stored labels.

5. A printing device according to claim 1, wherein the label memory includes an edit data portion which holds the position of the cursor, said cursor position being used to generate an address for addressing the selected storage section of a storage portion.

6. A printing device according to claim 1, wherein the first portion is the upper portion of the display and the second portion is the lower portion of the display.

7. A printing device according to claim 1, wherein the label access elements comprise boxes, a black box denoting a full storage section and a clear box denoting an empty storage section.

8. A printing device according to claim 1, which includes a printing mechanism for printing images based on label data held in the label memory.

9. A printing device according to claim 8, wherein the printing mechanism is operable to print said image data on a column-by-column basis and comprises tape feed means for feeding an image receiving tape past the print mechanism.

10. A printing device according to claim 1, wherein a first label access element represents the text data storage section, wherein a second label access element represents the attributes with which the characters are to be printed storage section, and wherein a third label access element represents the display control information storage section.

11. A method of storing label data in a label memory, the label memory comprising a storage portion having a plurality of storage sections, the method comprising the steps of:

displaying a plurality of label access elements on a first portion of a display of the printing device, each label access element representing a respective storage section in the storage portion of the label memory;

detecting the position of a cursor movable on the display;

accessing a selected one of said storage sections associated with the label access element identified by the cursor position; and displaying on a second portion of the display at least a part of any label data held in the selected storage section.

12. A printing device according to claim 11, wherein a first label access element represents the text data storage section, wherein a second label access element represents the attributes with which the characters are to be printed storage section, and wherein a third label access element represents the display control information storage section.

* * * * *